United States Patent [19]
Meitz

[11] 3,783,491
[45] Jan. 8, 1974

[54] AUTOMATIC SCREW DRIVER
[75] Inventor: Frederick W. Meitz, Chicago, Ill.
[73] Assignee: MSL Industries, Inc., Chicago, Ill.
[22] Filed: Apr. 7, 1972
[21] Appl. No.: 241,922

[52] U.S. Cl. .................. 29/212 R, 29/240, 144/32
[51] Int. Cl. .................. B23q 7/10, B23p 19/04
[58] Field of Search .................. 29/212, 211, 240; 144/32

[56] References Cited
UNITED STATES PATENTS

| | | | |
|---|---|---|---|
| 2,506,835 | 5/1950 | Johnson | 81/124.1 X |
| 3,258,042 | 6/1966 | Ruminsky | 145/50 X |
| 3,299,499 | 1/1967 | Ruminsky | 29/413 |
| 3,581,370 | 6/1971 | Passarella et al. | 29/240 X |
| 3,656,520 | 4/1972 | Caffa | 144/32 |
| 3,675,302 | 7/1972 | Dixon | 29/211 |

*Primary Examiner*—Thomas H. Eager
*Attorney*—Watson D. Harbuagh et al.

[57] ABSTRACT

A portable powered screw driver handling individual screws that have slotted and recessed heads. The screws are fed axially through the driver between non-rotating normally spread jaws which close behind the screw to form a screw driver bit that engages the head of the screw and advances it through a wrenching surface which rotates the bit to drive the screw into a work piece.

19 Claims, 14 Drawing Figures

PATENTED JAN 8 1974

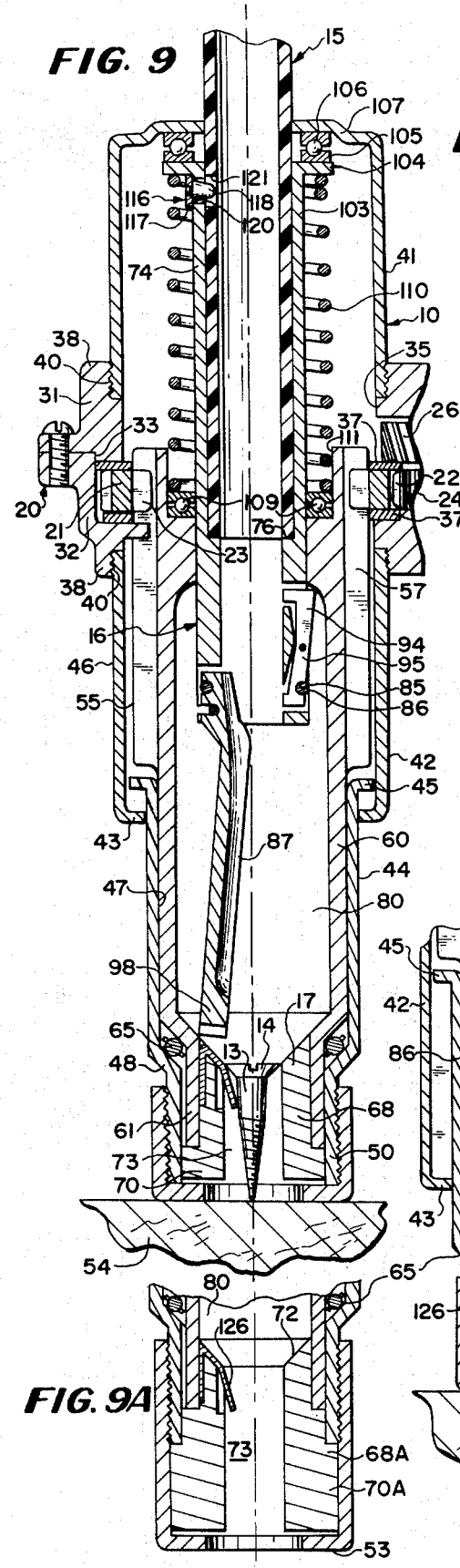
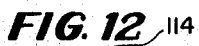
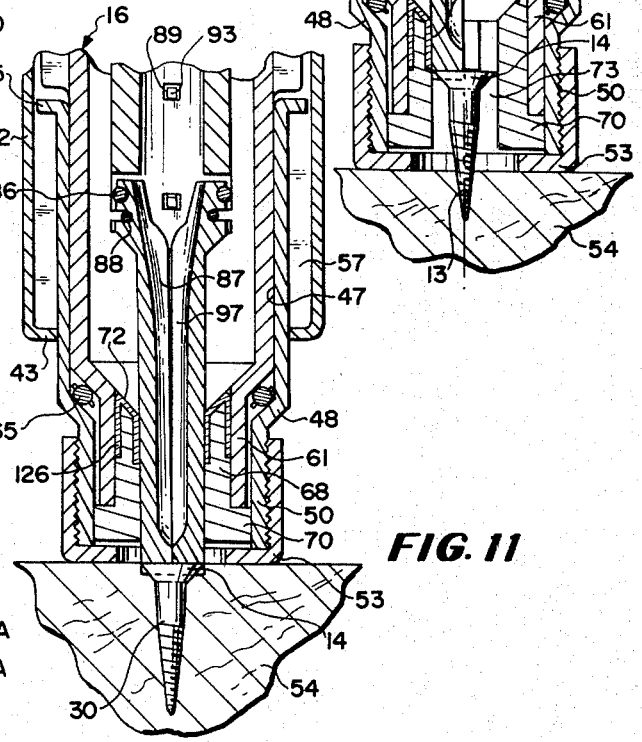
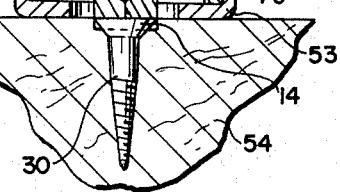

3,783,491

AUTOMATIC SCREW DRIVER

BACKGROUND OF THE INVENTION

The desirability of an axial feed power screw driver is recognized but heretofore has been used with wrench headed screws, sometimes referred to as bolts, which are supplied in strips, integrated end-to-end with frangible connections between them so that the lead screw can be severed after or during its tightening. The strip is generally advanced to its starting position by step ratchets controlled manually. Difficulties have been experienced in the feeding and holding mechanisms due to centrifugal force of the turning strip incurred with the rotating drive of the strip, particularly where the dogs and latches are responsive to such.

Moreover, screws integrated in strips or sticks generally have machine threads and the axial feed effort required is light as compared with driving self-cutting or tapered threads used with wood and metal screws. Also, machine thread screws are easily fed in frangible sticks since they can move axially into direct engagement with a continuously rotating wrench contour. The wrenchway receives the heads progressively in rotary drive relationship with the lead of the machine thread received in a prepared threaded opening operating to advance the screw stick.

On the other hand, acceptably pointed thread cutting screws for penetrating wood and metal, with or without pilot holes, do not lend themselves to feed-strips. They have heads with driven elements thereon directed axially to be engaged by a driving bit axially aligned therewith and the interengagement carries both an axial feed thrust and a rotary driving force. Accordingly, this type of screw has been fed as discreet elements from the side of the driver by collators and magazines so that the driver bit can be unitary, and strong to withstand the heavy rotational load as well as the end thrust required.

Auxiliary collators or side feeders limit the usefulness as to space and work area, as well as the portability of power screw drivers and generally add to the burden of labor handling them.

Preferably, the axial interengagement between bit and screw head is made and terminated when the bit is non-rotating.

SUMMARY OF THE INVENTION

In the present invention all end engaged headed screws can be fed and power driven axially through the tool including machine threaded screws as well as tapered and pointed screws. The greatest majority of those used have a length in the range of three-fourths inch to 1½ inches. Preferably the screws are loosely collated in a magazine which feeds or extends axially in a power tool which is small, compact, narrow for close spaces, and easy to handle. The screws can also be manually fed one by one as required, if desired, making it possible to use a miscellany of screws on a work piece. The screw driver can optionally be powered electrically or pneumatically.

The screws move axially through the drive shaft for the lead screw to engage an upper stop of an escapement member when the driver mechanism is in retracted position and the drive chamber is empty. Thereafter an initial slight advancement of the driver mechanism retracts the upper stop to release the lead screw and permit it to drop into a preliminary position with the head against the lower stop of the escapement and the screw shank disposed in a chamber defined between two longitudinally disposed jaws when closed. Return to retracted position releases the lower stop and spreads the jaws to drop the lead screw through to a drive position in front of the lower end of the jaws where it is resiliently held ready to engage a work piece and be engaged by the jaws.

Thereupon the spread screw driver jaws are advanced and cammed close behind the lead screw preferably without rotating. The ends of the jaws carry two diametrically aligned blades, or elements, which form the driving element or bit and thereafter the bit searches to engage the driven elements located on the head of the screw with the screw stationary or turning. Thereafter, or simultaneously therewith, the closed jaws slip into a driver member having a wrenching contour that is preferably cross-sectionally square. The driver member is located at the lower end of a rotatably powered driving sleeve whereby rotational forces are applied to the jaws while the bit is applying an end thrust that is independent of screw lead and rotation.

During the driving of the first screw, the lead end of the next screw has dropped into the preliminary position with its shank between the closed jaws and its head restrained by the lower teeth of the escapement ready to chute through the jaws into drive position when the jaws are again fully retracted and spread. Towards the end of the retraction the escapement is reversed to open the lower teeth and release the next screw and to close the upper teeth to catch the head of the screw thereabove in the feed magazine.

The reciprocation of the jaws is accomplished manually by a pistol grip on the housing. When it is moved towards an engaged work piece a non-rotating member on the housing yields for the screw point to engage the work piece and power is applied to the prime mover located in the pistol grip. It will be appreciated that a power control serially connected with the trigger control can be used which is actuated by movement of the driver jaws to synchronize the screw driving power with the feed pressure to avoid the possibility of damaging the screw head while feed pressure is being manually applied or released at the start and finish of the driving operation.

The invention is further characterized by feed assistance in positioning the screw in driving position depending on the power employed to energize the prime mover. In event of fluid pressure being used a small burst of air as the lower stop releases the screw can be applied to the jaw enclosure to assure fast location of the screw in its drive position ahead of the jaw ends, or if electrical power is employed the driver member can be magnetized to provide axial polarization to provide a solenoid action whereby the screw responds like an armature as centered by guide springs.

IN THE DRAWINGS

Figure 1:
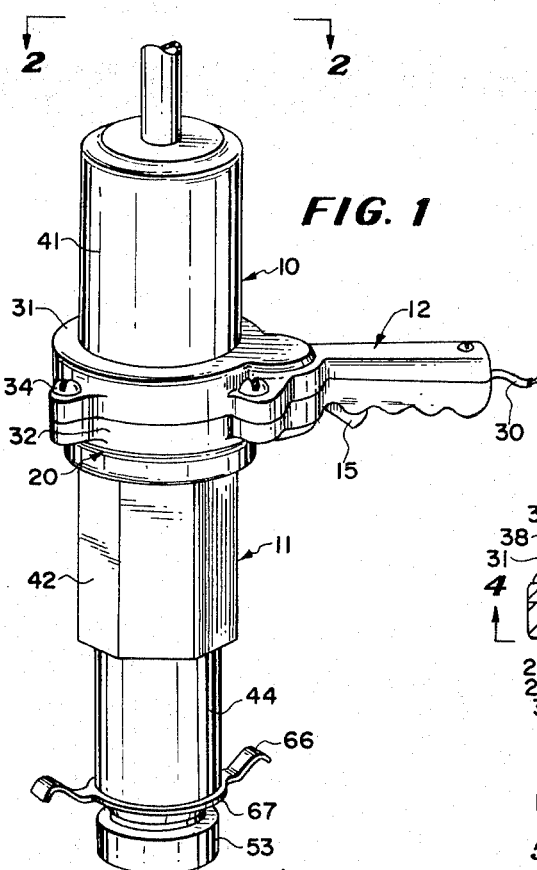
FIG. 1 is a perspective view of a portable, self feeding, powered screw driver embodying the invention.
Figure 2:
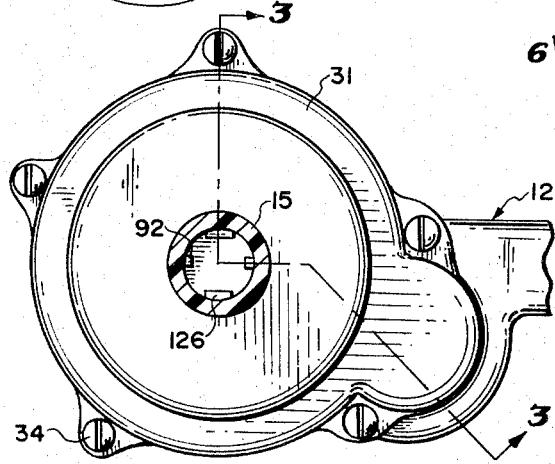
FIG. 2 is an enlarged top plan end view of the screw driver taken on the line 2—2 in FIG. 1.
Figure 3:
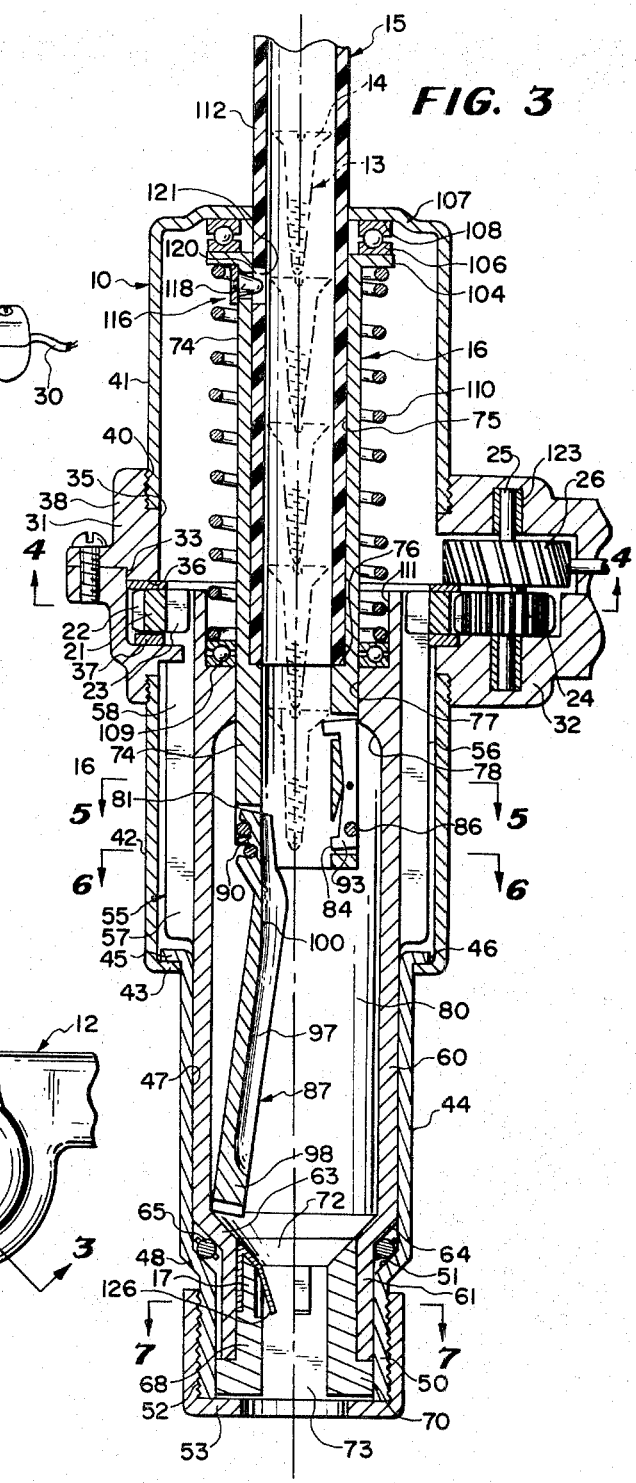
FIG. 3 is a quartered sectional view of the screw driver taken on the right angled line 3—3 in FIG. 1 illustrating the screw driver in its resting state and the relative mounting positions of the escapement and driven jaws.
Figure 8:
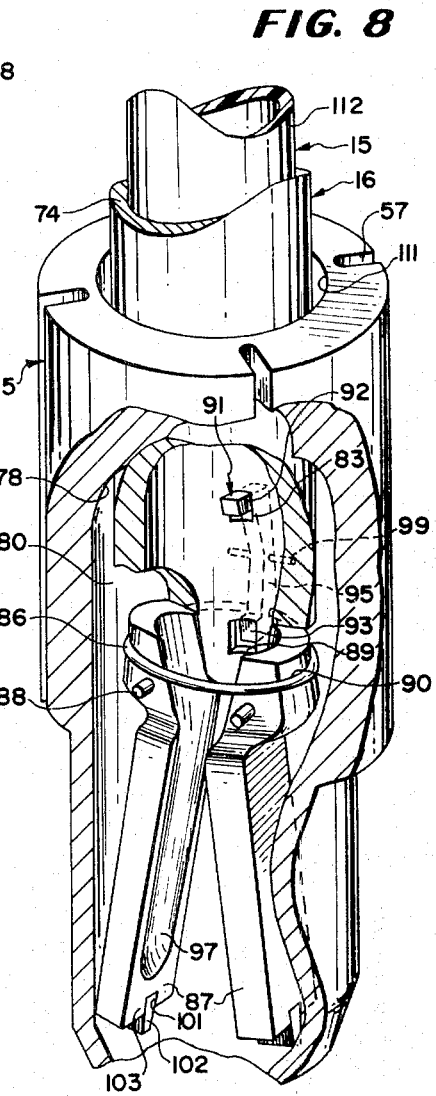
Figure 7:
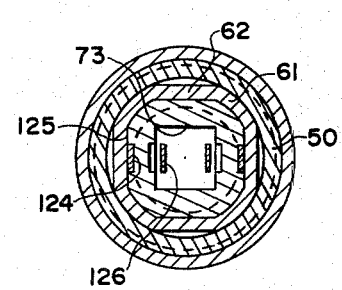

FIGS. 4, 5, 6 and 7 are cross sectional views taken on lines 4—4, 5—5, 6—6 and 7—7 in FIG. 1;

FIG. 8 is an enlarged perspective view, partially broken away to illustrate the structure and relative mounting positions of the escapement and driven jaws for advancing and driving the screws;

FIG. 9 is an enlarged longitudinal quartered sectional view similar to FIG. 3 illustrating the screw driver in a preliminary stage of advancement with an average length screw released and in point contact position ready to be driven;

FIG. 9A a lower portion of FIG. 9 illustrating adaptation of the screw driver for handling a longer screw;

FIG. 10 is a quartered sectional view similar to FIG. 9 illustrating the screw driver when a screw is partially driven into a work piece;

FIG. 11 is a quartered sectional view similar to FIG. 9 illustrating the disposition of the screw driver members when the screw is fully driven;

FIG. 12 is a longitudinal sectional view of the upper end of a feed magazine with a closure permitting introduction of screws manually into the screw magazine with the magazine in place;

FIG. 13 is a sectional view of the detent member releasably holding the magazine in feed position.

DESCRIPTION OF THE PREFERRED EMBODIMENT

For ease in identifying the many elements of the invention, wall thicknesses of the respective parts are illustrated as heavy, but it will be appreciated with the compactness of the screw driver provided by the construction and arrangement of the parts, the walls can be made of a light metal except where otherwise mentioned, or of thinner, ferrous metal within engineering design for purposes of lightness of the tool in the hands of a user.

Referring now to the drawings and the illustrated embodiment in further detail, an electrically powered screw driver 10 is shown with a vertical housing 11 supported by a pistol type handle 12 housing a motor. Loose screws 13 with slotted heads 14 are fed from a magazine 15 axially through a reciprocating screw driver means 16 (FIG. 3) which drops screws one at a time into drive position with respect to a wrench assembly 17. The driver means is then advanced to follow the screw and engage the slotted head in drive relation with downward pressure and the wrench assembly in telescoping driven relation. A trigger 18 on the handle is actuated to rotate the wrench assembly and driver means and thereby the screw.

Figure 4:
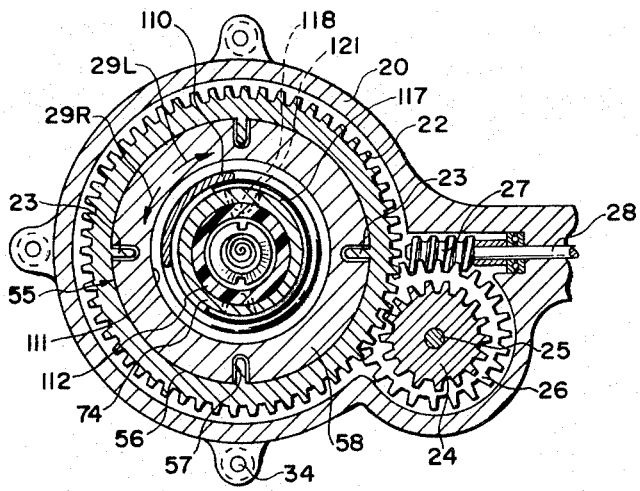
Figure 5:
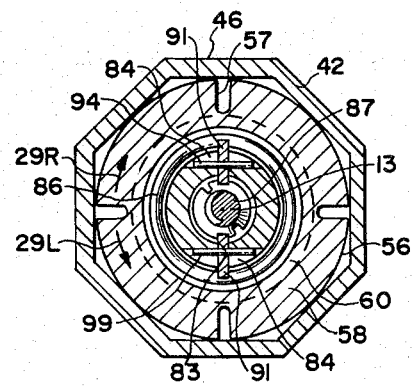
Figure 6:
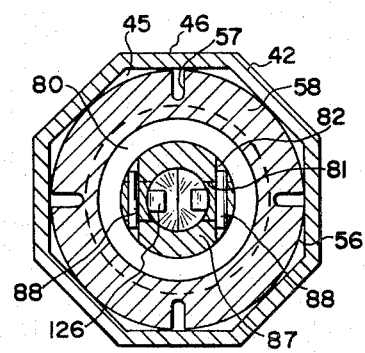

The housing 11 comprises a circular ring section 20 that journals a ring gear 21 having external teeth 22 and four radially directed axially extending splines 23 (FIG. 4). The ring gear is driven by a spur gear 24 carried by a counter shaft 25 which in turn is driven by a worm wheel gear 26 thereon engaged by a worm gear 27 of a speed reduction worm gear drive. The worm gear 27 is mounted on the drive shaft 28 of either a series wound motor armature or the rotor of a fluid motor. Power is supplied through an extension member 30 suitably through a trigger 18 controlled switch or valve (not shown) which includes in the power circuit a variable power device controlled manually by the relative trigger position to control the screw driver speed.

The circular ring section 20 is made in two parts, an upper shell 31 and a lower shell 32 which telescope together at 33 and are held together as a unit by screws 34 to define a central opening 35 therethrough into which the splines 23 extend concentrically. Facing shoulders 36 are provided and although ball bearings may be disposed on the upper side of the ring gear, it has been found that two lubricating washers 37 on opposite sides of the ring gear and between it and the shoulders 36 provide adequate end thrust support for the ring gear and the upper washer can be marginally accommodated between the spur gear 24 and the worm wheel gear 26. Thus the washers are exposed to adequate lubrication from the gearing lubrication.

Axial flanges 38 having internal threads 40 are provided on opposite sides of the ring gear to receive end cups 41 and 42 thereon whose inside minor diameters are equal to the diameter 35 to provide guide bearing support for elements reciprocable therein.

The lower cup 42, however, has a non-circular contour which can be referred to as octagonal as shown in FIG. 1 and terminates at its bottom end in a radial inward flange 43 that receives a sleeve hereafter referred to as the guide sleeve 44. The guide sleeve has an external flange 45 on its upper end reciprocably received in the lower cup 42 and the flange 45 has a peripheral contour 46 that mates octagonally in sliding, non-rotational relationship with the internal octagonal wall of the lower cup 42. At its lower end the cylindrical wall 47 of the guide sleeve 44 is terminally offset inwardly at 48 to form a cylindrical collar 50 that defines an end thrust bearing race shoulder 51 at its upper end and terminally an external thread 52 on its outer surface to threadably receive a work piece 54 engaging end cap 53 thereon (FIG. 9).

Journalled in said guide sleeve 44 is a unitized power driven unit 55 defining an external surface of revolution 56 provided with longitudinal grooves 57 on its enlarged upper portion 58 receiving the splines 23 in slidable interdrive relationship. A lower sleeve end 60 is terminally offset inwardly at 61 to provide four wall portions 62 (FIG. 7) defining a squared contour with an inwardly tapering interconnecting wall 63 above them and a race 64 opposing the race 48 for an end thrust bearing having ball bearings 65 between them. The driven unit 55 is mounted for its enlarged portion to be axially slidable and journalled in the cups 41 and 42 with the splines 23 on the ring gear 21 engaging in the spline grooves 57 as also journalled in the guide sleeve 44 which in turn reciprocates non-rotatively at its octagonal interengagement with the lower cup 42.

If desired the guide sleeve 44 cap joint at 67 may be provided with a ring accessory having wings 66 by which reciprocation of the parts can be manually made by one hand moving the wings 55 and thereby the stationary sleeve towards the cup 42 when the handle 12 is held by the other hand. This movement can be made with or without the unit 55 rotating and serves as an arming movement or to expose the screw point for placement in a work piece.

Depending on the length of the screw to be driven the wrench assembly 17 includes an adapter insert of predetermimed length (compare FIGS. 9 and 9A) which can be referred to as a wrench 68 and 68A is received in the lower end of the unit 55 as held in place by the threaded cap 53. Non-engagement clearance space between the lower end of the wrench and the cap is provided so that end thrust is confined to the ball bearing 65 and frictional heat is not developed in the work engaging end of the cap 53. The wrench 68 has an outer surface which defines a circular flange 70 which centers it with respect to the guide sleeve collar 50 and a reduced upper portion 71 whose exterior mates with the four flat wall portions 62 of the driven unit 55 in interdrive relationship. Internally the wrench insert defines a tapering upper camming and guide surface 72 ahead of a square wrench socket 73 extending therefrom to the lower end thereof. The socket receives in drive relationship the jaws of the screw driver unit 16 now to be described.

The screw driving unit 16 comprises a sleeve 74 preferably internally enlarged as at 75 to receive the screw supply magazine 15 against a shoulder 76 beyond which the tube is circular and of a diameter to pass therethrough the heads 14 of screws 13 to be driven thereby. Externally the sleeve is slidably received in the upper portion of the wrench assembly 17 as at 77 below which a tapering shoulder 78 is provided at a predetermined point on the internal wall of the sleeve 60 beyond which the unit defines a work chamber 80 of larger diameter.

Below the shoulder 78 the end of the sleeve 74 has a pair of end slots 81 (FIG. 6) diametrical disposed and radial extending to a predetermined depth with a chordal groove 82 across it on the external surface. Angularly spaced 90° therefrom longitudinal radial slots 83 (FIG. 5) are cut externally therein and also traversed by chordal grooves 84. The slots 83 terminate at openings 89 through the wall of the sleeve 74 longitudinally spaced a distance less than the length of the shortest screw to be driven. The chordal grooves 82 and 84 are spaced longitudinally and between them a circumferential groove 86 (FIG. 9) is externally provided to receive a C or O spring 86 therein.

Two jaws 87 (FIG. 11) having pivot pins 88 through them are dropped into the chordal grooves 82 (FIG. 6) with a notched end 90 on one side of the pin 83 received under the C spring for it to urge the engaged end 90 inwardly and the other end of the jaw outwardly. Two escapement members 91 having arms 94 and 95 carrying on their ends pallets 92 and 93, respectively, which alternately move through the openings 83 are rocked back and forth on pivot pins 99 received in the chordal grooves 84. The lower arms 95 are engaged by the C spring 86 to urge the pallets 93 radially inward (FIG. 9) when free to do so as at a time when the driving unit 16 is not retracted to the point where the cam shoulder 78 engages the other arm 94. When the arm 94 is engaged by the cam (FIG. 3) the arm 94 and pallet 92 are forced inwardly and rock the other arm 95 and pallet 93 outwardly.

The construction of the jaws 87 may be best understood when described as being formed by clamping them together as shown in FIG. 11 and drilling a hole 96 slightly larger than the size of the largest shank of screws to be driven, and then spreading the lower ends of the jaws to the position showing in FIG. 3 and redrilling the jaws with a drill slightly larger than the head of the largest head of screws to be driven, so that the heads of the screws may pass. Although such dimensions thereby provided are maintained, it is preferred to forge the jaws to the shape and contour shown in the drawings wherein the internal cavity 97 of the closed jaws is long enough to receive the threaded end of the longest screw to be driven so that its head can pass the upper pallets 92 when free to do so, but not the lower pallets 93 until they are retracted. Thus, the screw engaging the lower pallets 93 travels with the jaws while they drive the preceding screw and is released near the end of the back stroke when the upper arm 94 of the escapement engages the cam 78.

The external contour of the jaws 87 when closed define a square section over its length from the lower end 98 to a point at 100 close to the pivot pin 86 as related to the thrust distance required for the longest screw to be driven. This square contour is received in the wrench 68 in rotary drive relationship as when the lower ends 98 of the jaws are cammed together by the tapering surfaces of the wall 63 and guide surface 72 of the wrench 68 when advanced towards the wrench 68. Preferably the ends 98 of the jaws are cross kerfed (FIG. 8) at 101 to receive durable metal blades 102 therein swaged in place to provide the screw driver bit 103 when they are brought together edge-to-edge and held in the wrench 68.

There being little torsional strain upon the jaws 87 at their points of pivoting 86 since the driving torque is applied directly by the wrench 68 at the blade 98, their pivotal mounting is constructed essentially to carry the feed end-thrust that accompanies the drive of a wood screw of self cutting thread, and this axial force is applied to the upper end of the sleeve 74. For this purpose the upper end 103 is provided with a flange element 104 which may be removably secured to or formed thereon. If it is removable the driver unit 16 can be withdrawn downwardly when the cups 41 and 42 are removed. Otherwise it is withdrawn upwardly when the upper cup 41 is removed. Preferably the flange 104 is integrally formed on the drive unit 16 to carry on its upper face 105 an axial thrust frictionless bearing 106 carried against the bottom face of the top wall 107 of the upper cup 41 as centered in an upward recess 108.

The upper end of the drive unit 55 is recessed at 111 and a frictionless bearing 109 is provided at the bottom thereof. A compression spring 110 is disposed between it and the flange 104 to urge retraction and spreading of the jaws 87 for the coaction of the cam 78 and the arm 94 of the escapement member 91. The bearing 109 prevents torsional strain on the spring when the drive unit 55 and driven unit 16 do not rotate together. Although a conical spring may be provided to permit greater relative axial movement between the sleeve 74 and unit 55 the spring illustrated is helical since the retracted load is light and a heavy spring is not required which would further burden labor when axial screw advancing feed pressure is being applied. In either case the upper cup 41 is not likely to be loosened at its threaded joint since any torque thereon is clockwise in the same direction as the lead of the screw being driven and the tightening direction of the thread 40. It may be observed that although the lower cup thread may be a left hand thread to be self tightening, this has been found to be unnecessary in view of the bearings 65 and 109.

The removable magazine 15 may be a plastic tube 112 open at both ends. The upper end 113 (FIG. 12) can be connected to a continuing source of collated screws, if desired, as when the screw driver is to be used continuously in a limited production area, but preferably spring clips 114 clamp on the upper end 113 to prevent the wrong end of the magazine being inserted into the driver unit sleeve 74. This prevents the screws being accidentally fed head first in the device.

The spring clip with one-way fingers 115 also operates as a one-way latch to permit insertion of loose screws, one at a time, if desired, or many, if an empty magazine 15 is not removed and replaced with a charged one.

At a predetermined distance from its inner end the wall of the magazine tube 112 is provided with a radial snap means 116 releasably securing against axial displacement. The snap means comprises a C-spring 117 (FIG. 13) that is slipped into place over the outer surface of the tube 74. The spring is provided with one or preferably two upsets or detents 118 carried by them to project through radial holes 120 in the wall of the tube 74 and extending inwardly in resting position a distance approximately the thickness of the magazine tube 112. The magazine tube 112 in turn has holes 121 through the wall thereof releasably receiving the detents 118 and is held thereby releasably in place throughout movement of the screw driver in all working positions.

For example, the essential problem is merely to hold the magazine in place while the screw driver is being moved or operated in positions where the magazine is likely to fall out, or the operator tips the screw driver to see how many screws remain in a partially empty magazine.

Accordingly, a magazine can be slipped easily in place against the shoulder 76 and turned in either direction not to exceed 180° and the detents snap into place, and the detent is easily replaced if it becomes excessively worn. In this connection the holes are elongated appreciably in an axial direction to enable the engagement under wide manufacturing tolerances relating to the location of the holes 121 from the end of the magazine.

By way of further description the wrench assembly 17 is preferably made of a self lubricating alloy having graphite and molybdenum in it for strength and lubricity to reduce friction between it and other parts with which it is in surface moving contact. Thereby the need for lubricating the spline 23 and groove 57 drive at the ring gear 21 is minimized along with the areas where the wrench assembly contacts the cups 41 and 42 and the guide sleeve 60. Preferably the upper and lower shells 31 and 32 and the handle 12 are made of an aluminum base alloy with sintered self lubricating bearing sleeve inserts 123 provided for journalling the shaft 25.

The wrench 68 is preferably made of paramagnetic material permanently magnetized and possessing axial polarization.

The formation of the wrench 68 provides axial and radial grooves 124 (FIG. 7) extending along the outer surface on the flats 125 thereof up and around the upper end radially along the taper surface 72 and axially back along opposite faces of the square wrenching surface 73. U-shaped spring elements 125 of flat paramagnetic material are located in the grooves with inner fingers 126 biased towards each other to physically receive the shank of the screw 13 between them. There the magnetic flow through the center of the wrench 68 draws the screw shank centrally and then the head 14 of the screw is moved to the magnetized spring guide fingers 126 to be held centrally in ready position.

Ease of production assembly and servicing of the screw driver is time saving also. The ring gear 21 and washers 37 are located in the lower section 20 of the housing 11; the spur 25 and worm wheel 26 counter-shaft assembly is dropped into place; the top section 20 is lowered into position and secured by screws 34. The sleeve 44 is dropped into the lower cup 42, and the drive unit 17 dropped into the sleeve 44 with the ball bearing 65 between them. This assembly is secured in place by threading the lower cup 42 into place. A wrench 68 of suitable length for a selected screw is provided with the blade springs 126 and slipped into place where it is secured by the end cap 53. The jaws 87 are closed with the pins 88 in their respective grooves 82 on the drive sleeve 74 along with the escapement 91 as held in place by the spring 86; the detent ring 117 is slipped in place; the spring 110 and bearing washer 109 located in place and the jaws 87 are closed and inserted through the drive sleeve; the upper cup 41 is threaded into place with the bearing 106 in place ready to receive a screw loaded magazine. 15.

Servicing of the screw driver is accomplished by removing either cup which permits access to the subassemblies for lubrication, repair, or replacement of all parts without the use of tools other than a needle point to handle the springs 86 and 117 if required.

Interchangeability of wrench inserts 68 and 68A to accommodate varying lengths of the same size screw is readily accomplished by removal and replacement of the cap 53 and wrench 68. If the size of the screw head 14 is changed the wrench 68 can be changed and either the jaws 87 or a complete drive unit 74 if an appreciably smaller head requires a smaller diameter for the feed opening and passages.

The operation of the embodiment has been indicated along with the description of the cooperation of the parts. however, the versatility of the device for different handling of the screw driver resides in the ability to reciprocate the jaws by pressing the non-scarring stationary end cap 53 against a work piece 54 to guide the application of the screw and apply feed pressure and rotary power, or, manually retracting the guide sleeve 44 for the point of the screw to be exposed to sight and then locating the point and starting the feed pressure or power drive in selective order. Also, upon removal of the magazine the last screw remaining in the chamber can be pumped out by manually reciprocating the guide sleeve 44, the spring 110 being quite light to permit this.

For quick inspection it will be noted that removal of the lower cup 44 permits the whole assembly to be removed without disturbing any parts, although the spring 110 may retract the jaw assembly to the degree of its compression release in which case an empty magazine 15 left in place will maintain alignment for return.

The essential operation functions to step-feed the screws one at a time as the escapement rocks back and forth with reciprocation of the housing so that a screw falls into position ahead of the jaws after each retraction and is there delivered into ready position by magnetism, or a puff of air, to be engaged by the closed jaws which then slidably enter the wrench and drive home the screw with or without a torque hammer in the rotary drive chain, which may be a part of the motor drive supplied in the handle.

It will also be appreciated that with a reversing motor or gearing present in the device it can be used to remove screws. The jaws 87 can be advanced by manually retracting the guide sleeve to expose the bit 102 which can then be visually engaged with the slot of a screw to be removed. Reversing of motor or gearing then reverses and propels the power drive unit 55 in the direction of arrow 29L (FIG. 4). Thereupon the wrench 68 is lowered to surround the engaged screw head in bit guided relation. In fact, whether driving in the direction of arrow 29R or removing a screw in the direction of arrow 29L the wrench 68 when surrounding the screw head operates to keep the bit 102 centered in the screw slot for maximum engagement.

What is claimed is:

1. In a screw driver the combination of an axially movable screw driver sleeve means having a screw feed passage to recieve a charge of individual screws,
a plurality of jaws carried by said sleeve means opening in a radial direction to release a headed screw point-first between them and externally defining a wrench surface when closed,
rotatable wrench means axially receiving said headed screw and closing said jaws to reciprocably engage said wrench surface in rotationally drive relationship,
drive means for rotating said wrench means and thereby said jaws, and
means at the end of said closed jaws axially engaging the head of said screw in rotary drive relationship.

2. The combination called for in claim 1 including a housing enclosing said sleeve means and supporting said wrench means for relative rotation and axial movement thereof,
means supported by said housing resiliently urging said sleeve means to move said jaws out of engagement with said wrench means.

3. The combination called for in claim 1 including screw feed escapement means ahead of the jaws actuated by relative axial movement between said wrench means and sleeve means to feed screws individually to said jaws.

4. The combination called for in claim 1 in which said rotatable wrench means includes an axially polarized cylindrical magnet.

5. The combination called for in claim 4 including paramagnetic springs at the mouth of said wrench means to guide the shank of a screw into said wrench means.

6. The combination called for in claim 1 in which said wrench means includes cam means diverging towards said jaws to close the jaws as they are advanced into said engagement with said wrench means.

7. The combination called for in claim 3 in which said escapement means comprises a rocking member pivotally mounted on said sleeve means and including
longitudinally spaced pallet teeth alternately moved into said screw feed passage and spaced a distance related to the length of the shortest of said screws,
said rocking member being actuated in one direction by said wrench means, and
resilient means for actuating said rocking member in the opposite direction.

8. The combination called for in claim 1 in which said drive means comprises a tubular member supporting said sleeve means and defining a compartment in which said jaws are received for expansion,
said sleeve means having a reduced lower end portion defining a non-circular section receiving said wrench means for rotary drive purposes, and
manually actuated means for actuating said rotating means and reciprocating said sleeve means and said wrench means.

9. A screw driver comprising,
a portable housing means having a handle,
a rotary drive means journalled in said housing means,
a driven wrench means rotated by and axially movable with respect to said drive means and defining a screw receiving compartment and a wrenching contour,
screw driver means having a loose screw magazine through it to feed a screw one at a time to said compartment upon relative reciprocation advanced by said housing means towards a workpiece, and
said screw driver means including a screw driving member to axially interengage and advance said screw from said compartment and interengage said wrenching contour to rotationally drive said axially engaged screw.

10. The screw driver defined in claim 9 comprising,
a plurality of jaws which separate in a radial direction when free to do so in said compartment, and
means for feeding a screw to said wrenching contour through the separated jaws.

11. The screw driver defined in claim 10 including
cam means between said screw receiving compartment and said wrenching contour to close said jaws and guide said closed jaws into said wrenching contour.

12. The screw driver in claim 10 in which said screw driver comprises,
separable jaws closed to define said screw driver bit on the lower end to interengage the head of said screw and said wrenching contour in rotary relationship, and
escapement means actuated by relative movement between said drive means and driven sleeve for feeding screws one at a time between said jaws to said wrenching contour when the jaws are open in said compartment.

13. The screw driver defined in claim 9 in which manipulation of the handle moves the housing towards and away from a work piece, and including
resilient means interconnecting said driven sleeve and said housing to urge retraction of said screw driver means from said wrenching contour on said driven sleeve.

14. The screw driver defined in claim 9 in which said housing means includes a non-rotative lower cup means enclosing said driven wrench member,
a guide sleeve non-rotatively supported reciprocably on the lower cup means and supporting the wrench means with respect to a work piece,
bearing means interengaging said lower cup means and said guide for relative rotation and support of said drive means with respect to said work piece, and
resilient means between said screw driver means at one end and said housing and screw driver means at the other end to urge said interengagement and retraction of said screw driver means with respect to the work piece.

15. The screw driver defined in claim 9 in which said screw driver means comprises
a tubular lower portion,
jaw means having transverse pivot pins adjacent their upper ends and being recessed to receive the shank of a screw between them when closed, escapement means having transverse pivot means intermediate their ends and pallets at their ends with the respective pivot pins and pivot means arranged for portions of the escapement means and jaw means to overlap, slot means in said tubular lower portion adjacent the lower end and having transverse chordal openings in the wall of the tubular portion receiving said pivot pins, resilient means engaging said overlapping portions for urging them each to one of their two alternate positions, and means carried by said driven wrench means actuating said jaw means and escapement means to the other one of said alternate positions.

16. A portable powered screw driver comprising a housing having a mid portion supported by a handle, ring gear means journalled in said mid portion, drive sleeve means reciprocably engaging said ring gear means in driven relation and defining at its lower end a chamber terminating in a non-circular section defining an opening, driven sleeve means reciprocably journalled in said drive sleeve means and having a screw feed passage through the center thereof, a wrench member supported in said non-circular section for rotation thereby and defining an internal wrenching contour through which screws pass one at a time, a pair of jaws pivoted to the lower end of said driven sleeve means and reciprocable therewith in said chamber to open in said chamber and pass a screw therethrough and close to engage in said wrench member the head of the screw passed and to enter said section to advance said screw and be rotated by said wrench member, screw driver bit means on the lower ends of said jaws to engage and rotate said screw, and escapement means interengaging said drive and driven sleeve means to pass screws one at a time from said screw feed passage into said chamber during said reciprocation of the jaws.

17. The screw driver defined in claim 16 in which said wrench member is a magnet axially polarized.

18. The screw driver defined in claim 16 in which said wrench member includes spring fingers flexing downwardly in said wrenching coutour to guide the shank of a screw received therein.

19. The screw driver defined in claim 16 including a screw magazine, a driven sleeve receiving said magazine in said passage and having a radial aperture through the wall thereof, a snap-on spring disposed on said driven sleeve means at the level of said aperture and carrying one member of a two element detent means extending into said aperture, and said magazine carrying the other member of the detent means on the wall thereof a predetermined distance from its discharge end and releasably engaging said one member of detent means.

* * * * *